Aug. 9, 1949.　　　　S. D. RUSSELL　　　　2,478,324
PICKUP BALER
Filed May 18, 1943　　　　　　　　　　　3 Sheets—Sheet 3
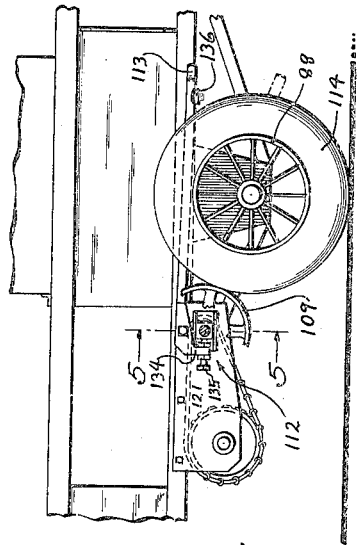
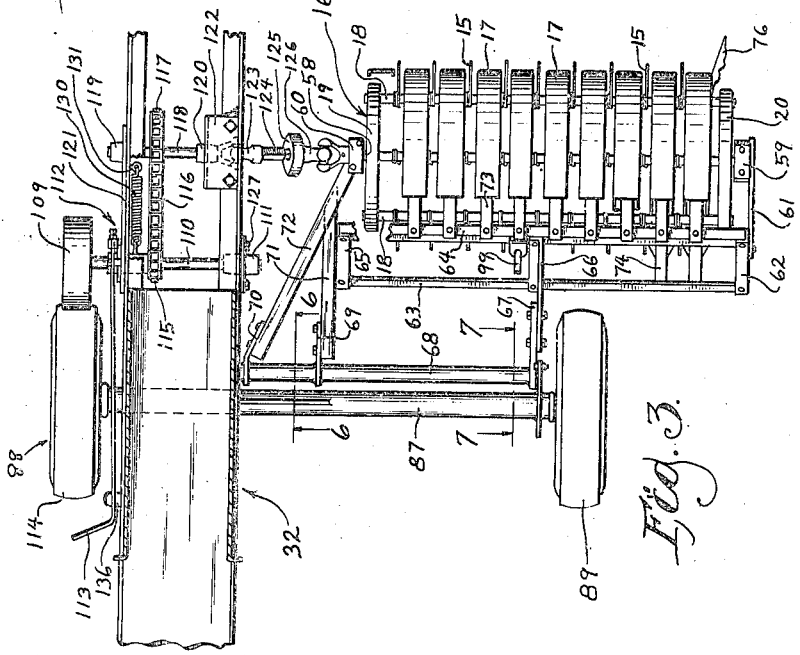
INVENTOR
Stanley D. Russell
BY
Emerson B. Donnell
ATTORNEY Patented Aug. 9, 1949

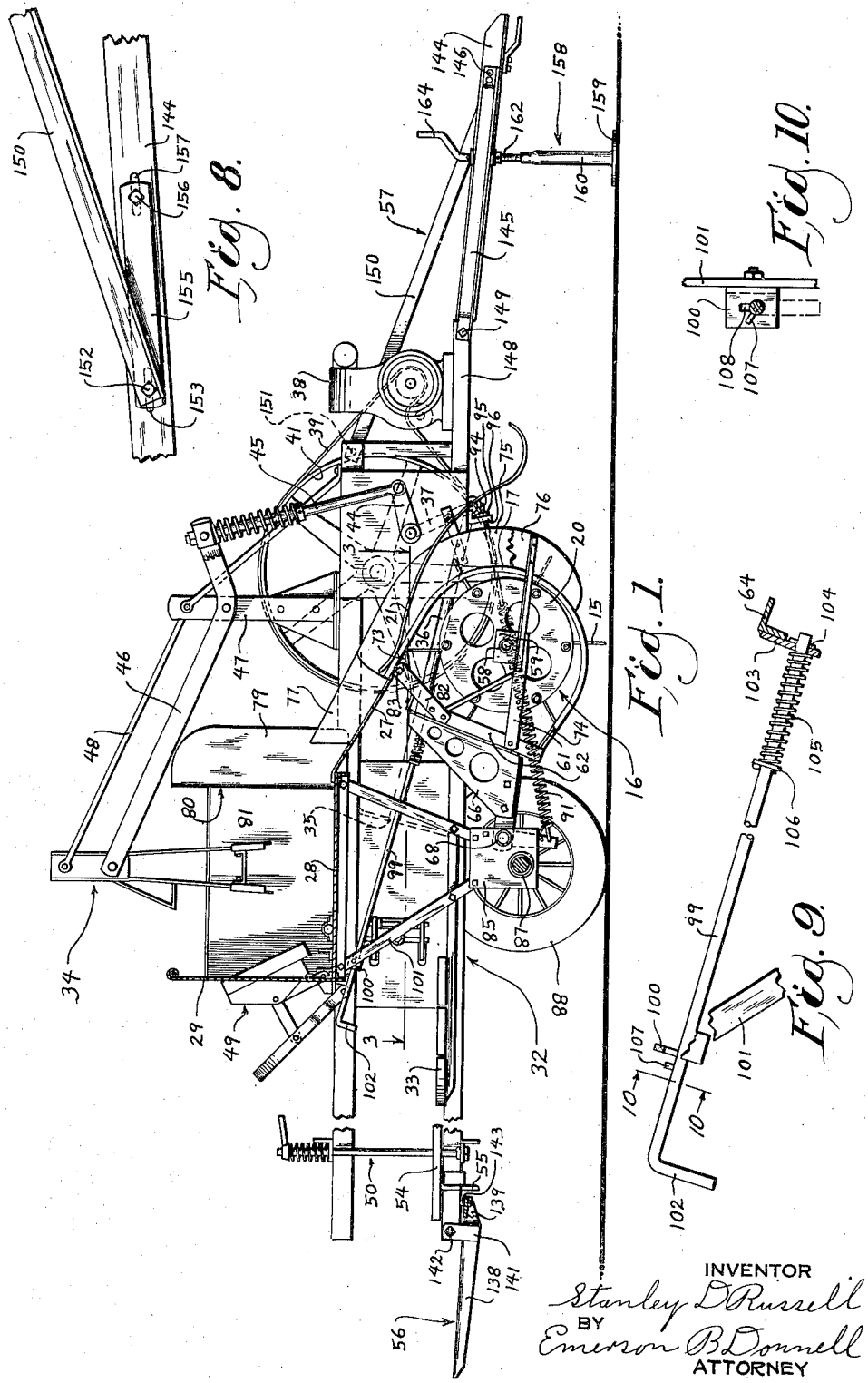

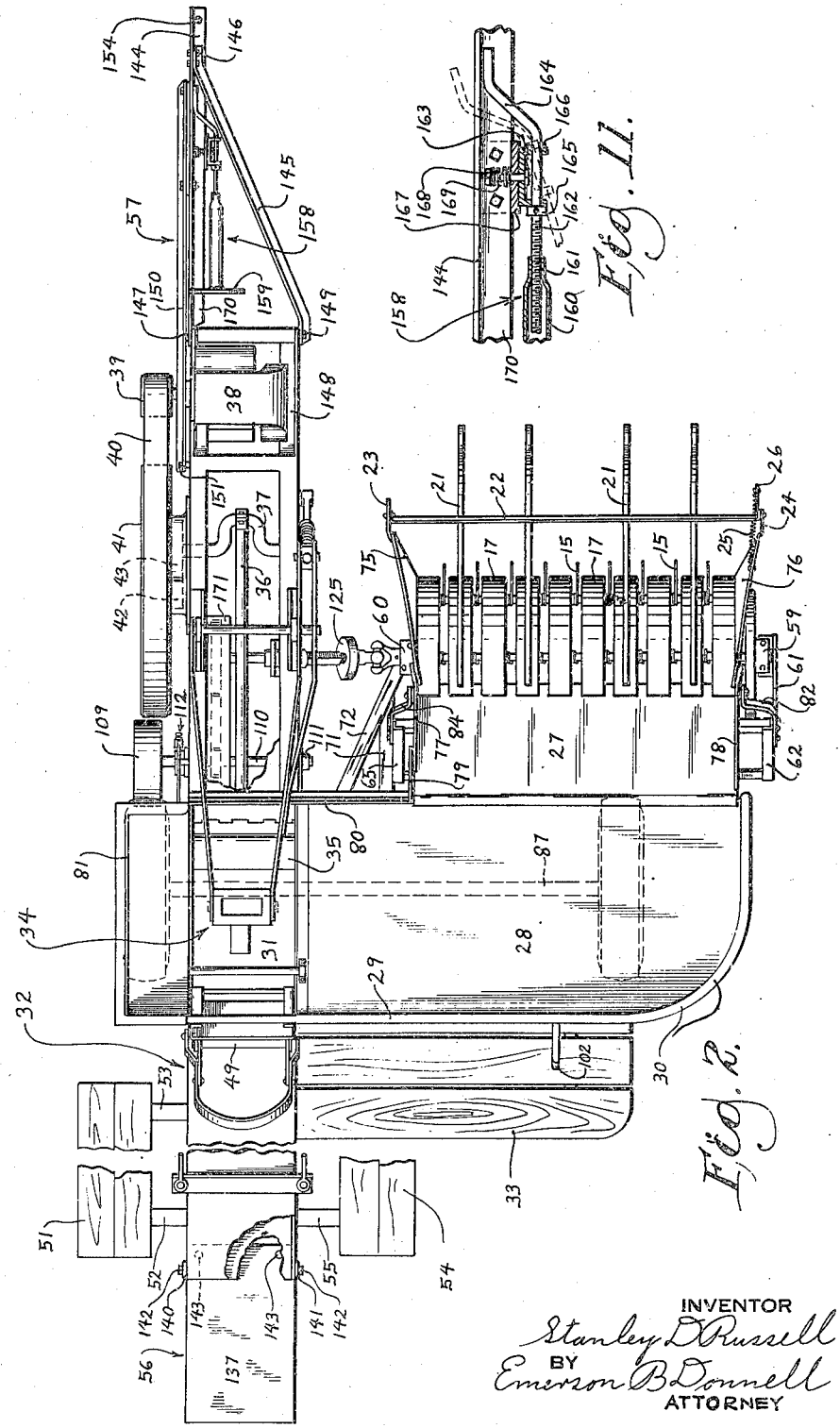

2,478,324

UNITED STATES PATENT OFFICE 2,478,324

PICKUP BALER

Stanley D. Russell, Racine, Wis., assignor to J. I. Case Company, Racine, Wis., a corporation Application May 18, 1943, Serial No. 487,482

1 Claim. (Cl. 56—364)

The present invention relates to baling machinery and more particularly to pickup balers designed to move over the field and pick up hay or other fibrous material which is baled during the progress of the machine over the field, and an object of the invention is to generally improve the construction and operation of devices of this class.

A further object of the invention is to reduce the cost of machines of this class and to make them available to larger numbers of people.

Further objects are to improve and simplify the pickup mechanism and the expedients for transmitting the material picked up to the department of the machine which does the baling.

A further object is to improve the end gate of such a machine.

A further object is to improve the hitch by means of which the machine is supported and propelled and further objects and advantages will become apparent from the annexed specification and drawings in which a satisfactory embodiment of the machine is shown. However, it is to be understood that the invention is not limited to the details disclosed but includes all such variations and modifications as fall within the spirit of the invention as herein expressed.

In the drawings,

Figure 1 is a right side elevation of the machine with parts in section and others broken away.

Fig. 2 is a plan view of the same with certain parts broken away.

Fig. 3 is a horizontal sectional view of the machine on the line 3—3 of Fig. 1 with parts removed.

Fig. 4 is a left side elevation of a part of the machine.

Fig. 5 is a vertical sectional view on the line 5—5 of Fig. 4.

Fig. 6 is a vertical sectional view on the line 6—6 of Fig. 3.

Fig. 7 is a vertical sectional view on line 7—7 of Fig. 3.

Fig. 8 is an enlarged detail of certain mechanism indicated in Fig. 2.

Fig. 9 is an enlarged detail of certain mechanism indicated in Fig. 1.

Fig. 10 is a sectional view taken on the line 10—10 of Fig. 9.

Fig. 11 is a horizontal sectional view of certain mechanism indicated in Fig. 2.

Pickup balers as known in the past have commonly been extremely large and heavy and composed of many parts so that the cost of the complete machine would place it out of reach of the majority of farmers. In the present instance, a pickup baler has been devised which is extremely light and maneuverable and which includes a pickup mechanism having only a single major moving part. As a result of the elimination of the many parts commonly associated with this class of machine, the weight and cost has been greatly reduced as a direct result of the novel combinations constituting the invention.

Assuming the machine to be progressing through the field from left to right, as seen in Figs. 1, 2 and 3, fibrous material as a windrow of hay lying on the field is engaged by teeth 15—15 of a pickup drum, generally designated as 16 and which is rotated as will be presently described in a counterclockwise direction as seen in Fig. 1. Fingers 15 lift the fibrous material and slide it on the plurality of adjacent curved strips or shrouds 17—17 which together constitute a chamber or housing within which drum 16 rotates. Fingers 15 project between strips 17—17 to engage the fibrous material and the curve and position of strips 17 are such that fingers 15—15 are exposed to the greatest extent to the fibrous material in the region of the lower front part of the chamber constituted by strips 17—17. The rotation of drum 16, owing to the shape of strips 17, causes fingers 15 to withdraw into the chamber constituted by strips 17—17 more and more as the fingers approach the top of drum 16 until they disappear within the chamber formed by strips 17—17 at a point substantially directly over drum 16.

This is done without the use of any mechanism such as cams or the like within drum 16, fingers 15 being flexible and resilient in nature but otherwise fixedly mounted on a plurality of pipes or rods 18—18 fixed in heads 19 and 20 constituting drum 16. The fibrous material is thereby slid upwardly over strips 17—17 which soon become highly polished. The material is thus propelled very easily thereover with the use of only the single moving part constituted by drum 16. Drum 16 is rotated by relatively simple auxiliary mechanism as will presently appear.

Material such as hay is easily affected by the wind and for this reason a plurality of curved strips 21—21 is carried by a cross brace 22 pivotally mounted on brackets 23 and 24, the assemblage being urged in a counter-clockwise direction by a spring 25 acting on a lever arm 26. Strips 21 therefore gently urge the material down onto strips 17 and prevent displacement by the wind. Strips 21—21 also compact the material slightly and keep it in contact with strips 17—17 and in engagement with teeth 15—15 to the greatest possible extent. A pickup of this general type is also disclosed in applicant's co-pending application, Serial 389,396, filed April 19, 1941, now Patent No. 2,362,861, and also in applicant's copending application, Serial 389,395, filed April 19, 1941, now Patent No. 2,378,107.

Material disengaged from fingers 15 is urged by following material still engaged with said fingers over a plate 27 leading rearwardly and upwardly to a platform or deck 28. Plate 27 and platform 28 are smooth and polished by the action of the material in a manner similar to strips 17—17 and the material is accordingly pushed and forced by following material not only upwardly over plate 27 but also backwardly over platform 28. Platform 28 has a rear upstanding wall portion 29 which, as more particularly seen in Fig. 2, has a curved portion 30. Material arriving on platform 28 is pushed to the rear and turned by curved portion 30 in the direction of a feed opening 31, in a baling chamber generally designated as 32. An operator standing on a platform 33 has immediate access to the material on deck 28 and helps it along as much as necessary toward opening 31, the amount of help needed depending upon the condition of the material and the degree of smoothness of plate 27, deck 28 and curved portion 30.

Material arriving over opening 31 is forced through the opening into bale chamber 32 by a feeder head generally designated as 34 and which may be of any suitable or well-known construction within the contemplation of the invention and preferably of the type disclosed in Richardson's pending application, Serial 359,310, filed October 2, 1940, now Patent No. 2,409,313. Material introduced into baling chamber 32 is forced rearwardly by a plunger 35, actuated by a pitman 36 driven by a crank shaft 37, journaled in a portion of bale case 32. Crank shaft 37 is driven from an engine generally designated as 38 having a pulley 39 driving, through a belt 40, a fly wheel 41. Fly wheel 41 drives through a gear 42, a gear 43 fixed on crank shaft 37 in a manner similar to that disclosed in the above mentioned patent of Richardson. Crank shaft 37 has another crank 44, Fig. 1, which actuates, through a pitman 45, an arm 46 fulcrumed on an upright 47 and connected with above mentioned feeder head 34, a parallel rod or link 48 extending between upright 47 and feeder head 34 serving to maintain the latter in the proper position during its up and down movement. The operator or platform 33 from time to time actuates a block dropping device generally designated as 49, to divide the resulting bales, in well-known manner not necessary to further describe. The material baled in chamber 32 proceeds backwardly toward the rear end of the chamber and which is preferably compressed to a certain extent by means of a compressor or clamping device, of well-known construction generally designated as 50. This provides for desirable resistance to the passage of the baled material in well-known manner.

A seat comprising a platform 51, Fig. 2, is carried on the left side of bale chamber 32 on brackets 52 and 53 and which is occupied by an operator who wires the bales in well-known manner. A seat comprising a platform 54 carried by a bracket 55 on the right side of bale chamber 32, carries another operator for wiring the bales as is well understood.

The bales proceeding rearwardly in chamber 32 are forced out onto a rear platform or tail gate 56 from which they are discharged and from which the blocks may be recovered as is well-known.

Bale chamber 32 at its forward end has a tongue or draw bar structure generally designated as 57 by which it is connected with a tractor or other propelling vehicle not shown.

Returning to a more detailed description of certain parts, drum 16 is built on a shaft 58 journaled in bearings 59 and 60 carried on a movable frame including a bar 61. Bar 61 is connected by an upright 62, Fig. 3, with cross bars 63 and 64 forming a rear rectangular frame for supporting above mentioned strips 17—17, cross bars 63 and 64 being connected by an upright 65. Cross bars 63 and 64 are connected approximately at their mid-sections by a plate, brace or bracket 66 which is connected with a rearwardly extending arm 67 rigidly attached to a torque tube 68. Torque tube 68 has a plurality of arms 69 and 70 to which are connected braces 71 and 72. Brace 71 is united with above mentioned upright 65 and also with brace 72, brace 72 continuing to a position to support above mentioned bearing 60 and being united therewith. Torque tube 68 is pivotally mounted as will appear and urged in a counterclockwise direction whereby to support drum 16 and the associated parts in desired positions.

Above mentioned strips 17—17 are connected with and supported by cross bars 63 and 64, each strip having a tongue portion 73 united in any suitable manner with cross bar 64 as seen in Figs. 1 and 3, and a strap 74 suitably united with cross bar 63.

At the ends of the chamber constituted by strips 17—17, flare sheets 75 and 76 are supported and serve to carry above mentioned brackets 23 and 24 and to guide incoming material and compact it on the pickup. Flare sheets 75 and 76 terminate inwardly of flanges 77 and 78 respectively, of above mentioned plate 27, flange 77 terminating inwardly in a wall or guide portion 79 extending forwardly from platform 28. A front wall 80 and an end wall 81, together with a continuation of rear wall 29 define an enclosure about above mentioned feed opening 31. Thus a chamber of substantial proportions is provided for the accumulation of hay or the like when it is desirable to temporarily stop the feed of material through opening 31 while continuing the forward motion of the baler. This is for the purpose of dropping a block or for other reasons. The operator stationed on platform 33 has direct control of the feeding of material, although as above stated, the feeding is substantially automatic once plate 27, deck 28 and rear wall 29 become smooth and polished by the action of the material. Above mentioned upright 62 carries a support 82 which extends upwardly and forwardly and, through a pivot 83, supports the outer lower end of above mentioned plate 27. A similar support 84 connects with upright 65 and supports the inner lower end of plate 27. Plate 27 rests at its upper end upon deck 28 on which it may slide in the event of up-and-down adjustment of the pickup.

As above suggested, torque tube 68 is journaled relatively to the machine, in the present instance in a plate 85 at its outer end and in a plate 86, Fig. 6, at its inner end, plates 85 and 86 being carried by an axle 87 on which are journaled supporting wheels 88 and 89. A solid support is thereby given to torque tube 68 which is rugged enough to carry the weight of pickup drum 16 and its attached parts. Above mentioned arm 70 on torque tube 68 has a portion 90 extending downwardly and engaged by a counterbalancing spring 91 which may be engaged in one or another of holes 92—92 so that the leverage exerted on tube 68 will be sufficient to continuously upwardly urge pickup drum 16 by counterclockwise rotation of tube 68. Thus the pickup is biased to an elevated or transport position.

As seen in Fig. 7, this upper position is governed by a stop member or bolt 93 fixed in above mentioned plate 85 and which stop is engaged by above mentioned arm 67.

Spring 91, as seen in Fig. 1, is anchored by a bolt or the like 94 having a nut 95 engaged with a bracket 96 fixed with bale case 32. Adjustment of nut 95 therefore tensions spring 91, the required amount to raise the pickup.

Working position of pickup drum 16 is obtained as will appear by overcoming spring 91 and forcing the drum and associated parts to a predetermined lowered position. In the present instance, this lowered or working position is determined by a stop plate 97, Fig. 6, fixed with portion 90 as by a clamping bolt 98. Plate 97 contacts axle 87 when the desired lowered position of drum 16 is reached. In the present instance, plate 97 is eccentric or cam shaped so that the lowered position of the pickup may be adjusted by loosening bolt 98, shifting 97 and clamping it in a new position by retightening bolt 98. Ordinarily, it is unnecessary to change this position once it is correct unless wear or other changes in the parts take place, the fingers 15 clearing the ground by a small amount, on the order of one-quarter of an inch.

It will be noted that this pickup therefore does not contact the ground at all at any point, nor does the whole machine within a radius of several feet of the point of lifting the material from the ground. Thus there is no part of the machine tending to hold down material which is intended to be picked up, as is common in prior pickups. For this reason, fingers 15 will clear an area on the field which is appreciably wider than the extent of pickup drum 16. Hay or other fibrous material tends to knit together to a certain extent and if the bulk of a given mass is engaged and lifted from the ground, substantially all of the loose material immediately adjacent will be also lifted because of entanglement in the mass. This is true of applicant's pickup but, of course, not true of prior constructions in which supporting wheels, shoes or the like, rest on the ground at the sides or in the immediate vicinity of the actual pickup mechanism. Any loose material "stepped on" by such wheels or shoes is, of course, torn loose from the mass and remains on the ground. The fact that such material has been pressed into the ground makes it difficult, if not impossible, to pick up on a succeeding round.

The upper and lower positions of pickup drum 16 are under the control of the operator on platform 33. For this purpose, a rod 99 is slidably supported in a bracket 100 carried in the present instance on a brace 101 extending between platform 28 and plate 85. Rod 99, as more particularly seen in Figs. 9 and 10, has a handle portion 102 at its rear end and extends forwardly through a plate 103 mounted on above mentioned cross bar 64. A pin 104 prevents removal of rod 99 and a spring 105 is compressed between plate 103 and a suitable abutment 106 fixed on rod 99. Forward sliding of rod 99 by means of handle 102 will thus force cross bar 64 forwardly, rotating the pickup structure with torque tube 68 and extending spring 91. Spring 105 may be further compressed but will yield and allow the pickup to rise in the event of encountering an obstruction. Rod 99 is provided with a pin 107 which may be aligned with a slot 108 in bracket 100 as rod 99 is pushed forwardly. Pin 107 therefore passes through slot 108 after which it is misaligned so that rod 99 may not return. This holds the pickup in operative position. Pin 107 is preferably so placed as to be misaligned with slot 108 when handle 102 points straight down. This is the position which the parts would normally take under the vibration of the operating machine so that pin 107 will normally not align with or pass through slot 108 without conscious effort on the part of the operator on platform 33.

Drum 16 is rotated in the present instance from supporting wheel 88. As particularly seen in Figs. 3, 4, and 5, a pulley or roller 109 is fixed on a shaft 110 journaled in bearings 111 and 112. Roller 109 may be pressed by a lever 113 into contact with wheel 88 which is normally provided with a rubber tire 114. The frictional contact with tire 114, exerts a sufficient driving force on pulley 109 to effect the necessary low power drive to drum 16. Shaft 110 in the present instance drives through a sprocket 115, a chain 116 and a sprocket 117, a shaft 118. Shaft 118 is journaled in bearings 119 and 120, supported from bale case 32 as by plates 121 and 122 respectively. Shaft 118 is connected with shaft 58 of above mentioned drum 16 by means of a tumbler shaft of suitable construction, including in the present instance a universal joint of well-known form 123, a telescoping shaft 124, an overrunning clutch 125 and a second universal joint 126. In this manner, pickup drum 16 is free to rise and fall without interference from the drive mechanism and without straining the parts concerned. Overrunning clutch 125 prevents running pickup drum 16 backwards in the event it is necessary to back the baler.

Bearing 111 may be shifted on bale chamber 32 by loosening clamping bolts 127 to obtain the proper position of shaft 110 and the bearing is of any suitable or well-known type providing for limited misalignment of shaft 110. Bearing 112 as more particularly seen in Fig. 5, is supported in above mentioned plate 121 in the present instance between guide plates 128 and 129 so as to be slidable forward and backward to adjust roller 109 into or out of contact with tire 114. A spring 130 is connected to bearing 112 and anchored at 131 on bale case 32. Bearing 112 is thereby urged forwardly to remove roller 109 from tire 114. Lever 113 is fulcrumed on a pin or the like 132 fixed with bale case 32 and spaced from the latter by a spacer 133. Lever 113 has a downwardly extending arm 134 carrying a set screw 135 pressing against bearing 112 to urge it rearwardly so as to press roller 109 into contact with tire 114. In its upper position, lever 113 is engaged over a lip or hook member 136 and in this position set screw 135 maintains pulley 109 in sufficiently firm engagement with tire 114 to drive the pickup parts including drum 16. When it is desired to interrupt the drive, lever 113 is disengaged from lip 136 and allowed to drop to the dotted position seen in Fig. 4, where it rests upon axle 87. Spring 130 pulls bearing 12 forward, disengaging pulley 109 from tire 114 and stopping the drive to pickup 16.

Above mentioned tail gate 56 is composed of a plate 137 having downwardly turned flanges 138 and 139. It is also provided with upwardly extending ears 140 and 141, Fig. 2, pivoted to bale case 32 as by bolts 142—142. A portion of plate 137 extends forwardly of pivots 142 and has abutments 143—143 which engage the underside of bale case 32 when gate 56 is in the desired lowered position. Therefore, no supporting chains or other means are necessary for maintaining the position of gate 56. Bales arriving on gate 56 may thus be disposed of rearwardly or at either side as most convenient since there are no flanges or supporting chains to interfere as is common in the prior art.

Hitch 57, as seen in Figs. 1, 2 and 8, comprises forwardly extending members 144 and 145 united at 146 to form an A frame. Member 144 is pivoted at 147 to an engine platform 148 forming part of bale case 32 while member 145 is pivoted at 149 to platform 148. To render the arrangement stable, a diagonal brace 150 is pivoted at 151 to an upper portion of bale case 32 and also to above mentioned member 144, as by a bolt 152. Bolt 152 is adjustable in a slot 153 in above mentioned member 144 and when loosened permits up-and-down adjustment of members 144 and 145. Bolt 152 is located as near as convenient to a hitch pin opening 154 in member 144 so as to reduce the length of the unbraced portion of member 144 to a relatively small amount. The stresses tending to displace bolt 152 become quite substantial on rough ground and in order to insure against shifting of the bolt, a strip 155 is interposed between members 150 and 144. Strip 155 extends backwardly from bolt 152 and is clamped in engagement with member 144 by an additional bolt 156 clamped in a slot 157. Therefore shifting of bolt 152 in slot 153 will necessarily require shifting of bolt 156 in slot 157. The clamping effect is therefore twice what it would be with a single bolt as 152, while the point of attachment of brace 150 is desirably near hitch pin opening 154.

For convenience in supporting the machine, in the absence of a tractor or other supporting vehicle, a stand generally designated as 158 is provided attached to draw bar 57. As seen in Figs. 1, 2 and 11, this comprises a plate 159 carrying an upstanding tubular member 160 with which is threadedly engaged at 161 a shaft 162. Shaft 162 is journaled in a clevis 163 and has a crank portion 164 by which it may be rotated to raise and lower draw bar 57 as will be apparent in Fig. 1. A collar 165 prevents end-wise movement of shaft 162 in clevis 163 in one direction and a pin 166 prevents such movement in the other direction. Clevis 163 is urged against a bracket 167, fixed with member 144, by a bolt 168, a spring 169 surrounding the bolt and forcing clevis 163 into contact with bracket 167. When stand 158 is not in use, it is swung to an inoperative position indicated in Fig. 2. To reach this position, plate 159 must pass a flange portion 170 of above mentioned member 144. This is accomplished by compression of spring 169 and shifting of clevis 163 temporarily away from bracket 167 as suggested in dotted lines in Fig. 11. When stand 158 reaches its inoperative position, spring 169 maintains the parts in the position shown in Fig. 2 until again needed. Various safety devices, etc., may be applied as desired or found necessary, in the present instance a shield 171 being supported on bale case 32 above drive chain 116 and its associated parts.

The operation of the above described invention is thought to be clear from the foregoing description, it being pointed out that the object of simplifying the pickup baler has been accomplished to a marked degree. Notably the pickup itself has but one major moving part, namely drum 16, the auxiliary drive being simple but exceedingly effective for the purpose. A distinct advantage of this type of drive is that the rotation of the pickup drum is in direct proportion to the rate of forward travel of the machine so that the hay or other crop is handled in the gentlest possible manner and not torn apart, shredded, or shattered as is common in known constructions, particularly if the rate of travel is slower than that for which the machine was designed. It is thought that the construction disclosed is well adapted to accomplish the objects of the invention as set forth and what is claimed as new and desired to be secured by Letters Patent of the United States is:

In a pickup for use with a crop treating device, having an upper point of disposition for material picked up, the combination of a set of shrouds defining a curved chamber, a drum rotatably supported within the chamber, and having a plurality of outwardly projecting fingers, said drum being so disposed in said chamber that said fingers project therefrom between said shrouds to pick up and slide material over said shrouds and to recede into said chamber at a predetermined point, an inclined plate pivoted to said chamber and leading rearwardly and upwardly from the region of said predetermined point, over which material may be slid by following material, a plurality of strips spaced from said shrouds to overlie material being slid over said shrouds by said fingers and hold it against displacement, a stationary platform at the upper end of said inclined plate and leading transversely of the direction of travel of the pickup to said point of disposition and a curved rear wall for said platform disposed to receive material sliding up said inclined plate and to turn it in the direction of said point of disposition.

STANLEY D. RUSSELL.

REFERENCES CITED

The following references are of record in the file of this patent:

UNITED STATES PATENTS

| Number | Name | Date |
|---|---|---|
| 1,062,887 | Carr | May 27, 1913 |
| 1,227,355 | Wright | May 22, 1917 |
| 1,464,808 | Como | Aug. 14, 1923 |
| 1,595,446 | Borton | Aug. 10, 1926 |
| 1,627,660 | Maxwell | May 10, 1927 |
| 1,815,327 | Raney et al. | July 21, 1931 |
| 1,850,458 | Hyman | Mar. 22, 1932 |
| 1,914,698 | Mainland et al. | June 20, 1933 |
| 1,979,974 | MacGregor | Nov. 6, 1934 |
| 2,038,809 | Tallman et al. | Apr. 28, 1936 |
| 2,069,004 | Butler et al. | Jan. 26, 1937 |
| 2,150,066 | Kalb | Mar. 7, 1939 |
| 2,195,831 | Thompson et al. | Apr. 2, 1940 |
| 2,242,077 | Jones | May 13, 1941 |
| 2,256,830 | Johnson | Sept. 23, 1941 |
| 2,259,908 | Raney | Oct. 21, 1941 |
| 2,292,779 | Barker | Aug. 11, 1942 |